US012440743B2

(12) United States Patent
Cranke

(10) Patent No.: US 12,440,743 B2
(45) Date of Patent: Oct. 14, 2025

(54) MIRROR REFLECTIVE TRAINING DEVICE

(71) Applicant: Christopher Tolbert Cranke, Upper Marlboro, MD (US)

(72) Inventor: Christopher Tolbert Cranke, Upper Marlboro, MD (US)

( * ) Notice: Subject to any disclaimer, the term of this patent is extended or adjusted under 35 U.S.C. 154(b) by 305 days.

(21) Appl. No.: 18/182,984

(22) Filed: Mar. 13, 2023

(65) Prior Publication Data
US 2023/0285826 A1 Sep. 14, 2023

Related U.S. Application Data

(60) Provisional application No. 63/318,867, filed on Mar. 11, 2022.

(51) Int. Cl.
*A63B 69/20* (2006.01)
*A63B 69/22* (2006.01)
*A63B 71/06* (2006.01)

(52) U.S. Cl.
CPC .............. *A63B 69/20* (2013.01); *A63B 69/22* (2022.08); *A63B 69/222* (2022.08); *A63B 69/305* (2022.08); *A63B 2071/0647* (2013.01); *A63B 2209/00* (2013.01); *A63B 2225/12* (2013.01)

(58) Field of Classification Search
CPC . A63B 2071/0647; A63B 69/20; A63B 69/22; A63B 69/222; A63B 69/305; A63B 2209/00; A63B 2225/12
See application file for complete search history.

(56) References Cited

U.S. PATENT DOCUMENTS

| 9,586,120 | B1 | 3/2017 | Sotelo | |
|---|---|---|---|---|
| 2007/0087912 | A1* | 4/2007 | DeCologero | A63B 69/305 482/86 |
| 2011/0077134 | A1* | 3/2011 | Smith | A63B 69/305 482/83 |
| 2016/0039502 | A1 | 2/2016 | Pajonk-Taylor et al. | |
| 2016/0367856 | A1 | 12/2016 | DePompe | |
| 2023/0130952 | A1* | 4/2023 | Carroll | A63B 69/305 482/86 |

* cited by examiner

*Primary Examiner* — Megan Anderson
(74) *Attorney, Agent, or Firm* — Makoui Law, PC; Ali Makoui

(57) ABSTRACT

The reflective training device is an equipment that integrates mirror reflective technology to training sports, especially combat sports. The device aims to give athletic users an instantaneous way to observe detailed nuanced movement specific to the user's sport and or activity. An athletes' ability to perceive oneself in real time while performing true game time and competition movements can be revolutionary and change the dynamics in a multitude of sports and physical activity. To accomplish this, a mirror reflective fabric, mirror reflective material and/or hardened mirror reflective matter is added on to the training device, so as to give the user feedback on how intense a movement may be. The device further enables users to gauge how low or how well they are positioned while performing specific movements. Further, the training device includes different cushioning layers and support structures that enable users to have a sturdy and smooth reflective surface.

14 Claims, 13 Drawing Sheets

MIRROR REFLECTIVE TRAINING DEVICE

FIELD OF THE INVENTION

The present invention relates generally to an apparatus for mirror reflective technology. More specifically, the present invention is an apparatus for mirror reflective technology to give athletic users an instantaneous way to observe detailed nuanced movement specific to the user's sport and or activity.

BACKGROUND OF THE INVENTION

When training in sports, competitors need innovative intuitive ways to improve their athletic abilities. Athletes look for training regimens that can rapidly increase their skillsets. They also scrutinize their workout routines to gain feedback on their technique and form. Overall, the end goal is to adopt a program that can yield the upmost results and offer ways to tweak imperfections along the way. There needs to be an effective training tool that can consolidate these two notions so that athletes can maximize their training routines. Incorporating an inventive mirror reflection technology to training equipment athletes use in their respective sports, and or adding this technology to tools, objects, and or gear, used in these sports, will produce the needed benefits athletes are looking for.

An objective of the present invention is to integrate mirror reflective technology to any training device, that can be applied to combat sports like Boxing, MMA, Kick Boxing, Muay Thai, Karate etc. It is further an aim of the present invention to provide cushioning layers and support elements that makes a sturdy training device with a clean and smooth reflective surface.

SUMMARY

The reflective training device is an equipment that integrates mirror reflective technology to any training sports, especially combat sports. It is an aim of the present invention to give athletic users an instantaneous way to observe detailed nuanced movement specific to the user's sport and or activity. To accomplish this, a mirror reflective fabric, mirror reflective material, mirror reflective substance and/or hardened mirror reflective matter is added on to the training device, so as to give the user feedback on how intense a movement may be. The device can further provide a way for users to gauge how low or how well they are positioned while performing specific movements. An athletes' ability to perceive oneself in real time while performing true game time and competition movements can be revolutionary and change the dynamics in a multitude of sports and physical activity. Further, the reflective training device comprises different cushioning layers and support structures that enables users to have a sturdy, clean, and smooth reflective surface.

DETAIL DESCRIPTIONS OF THE INVENTION

Figure 1:
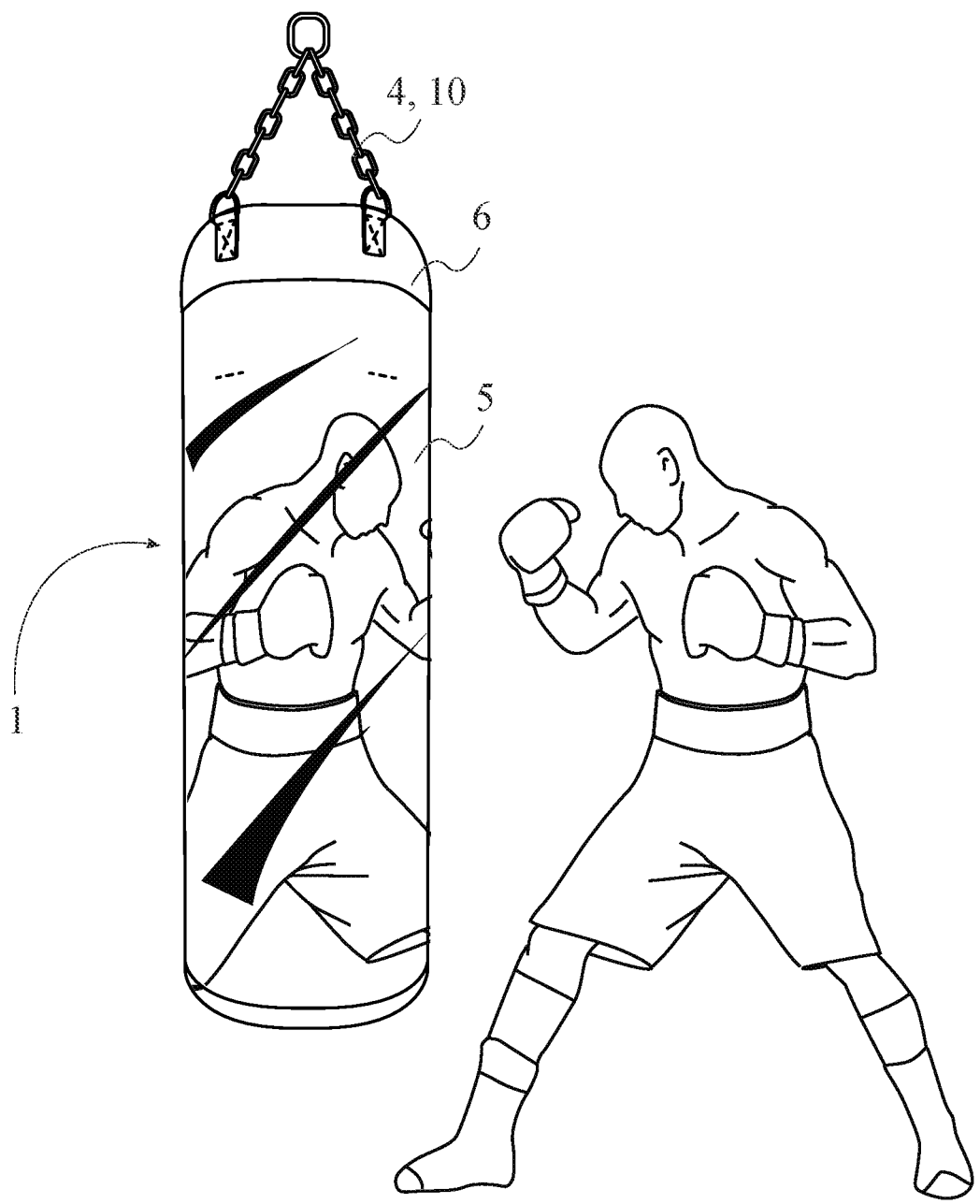
FIG. 1 is a perspective view of the present invention in use, wherein a user is working with a big punching bag with a reflective surface.
Figure 2:
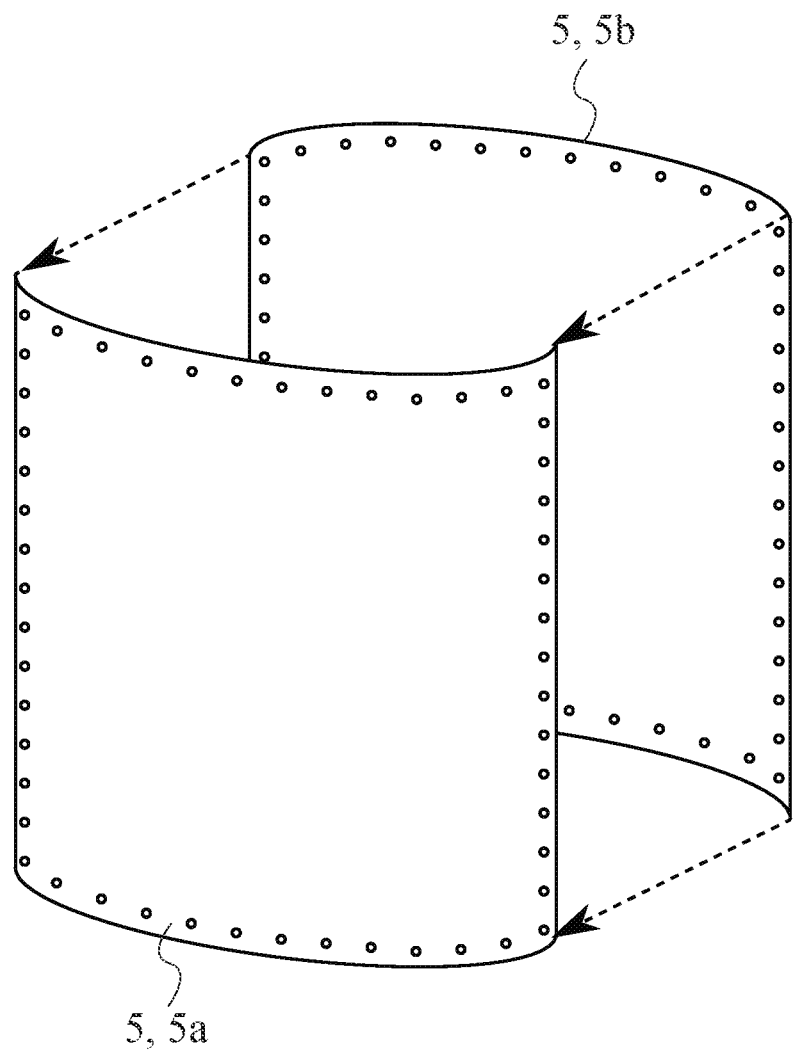
FIG. 2 is a perspective view of a first stage among different stages in which a punching bag with a reflective surface is constructed according to a preferred embodiment of the present invention.

All illustrations of the drawings are for the purpose of describing selected versions of the present invention and are not intended to limit the scope of the present invention. The reflective training device is an equipment that integrates mirror reflective technology to any training sports, especially combat sports. It is an aim of the present invention to give athletic users an instantaneous way to observe detailed nuanced movement specific to the user's sport and or activity. To accomplish this, a mirror reflective fabric, mirror reflective material, mirror reflective substance and or hardened mirror reflective matter is added on to the training device, so as to give the user feedback on how intense a movement may be. The device can further provide a way for users to gauge how low or how well they are positioned while performing specific movements. An athletes' ability to perceive oneself in real time while performing true game time and competition movements can be revolutionary and change the dynamics in a multitude of sports and physical activity. Further, the reflective training device comprises different cushioning layers and support structures that enables users to have a sturdy, clean, and smooth reflective surface.

In reference to FIG. 1 through FIG. 13, the present invention is a reflective training device. Integrating mirror reflective technology can be applied to combat sports like Boxing, MMA, Kick Boxing, Muay Thai, Karate etc. It can be added to various training equipment. For example, a punching bag that can reflect like a mirror would allow the user to perceive themselves in real time while performing boxing/combat specific movements. As the boxer punches the bag the user can instantaneously see whether their technique and or form are correct. To be specific, the user may notice a particular part of their body being exposed while throwing punches at the mirror reflective punching bag. Such a bag could allow the user to notice a potentially defensive vulnerability and immediately fix it in real time. In addition, while the boxer is using the reflective punching bag, they can gauge their speed and intensity. Perhaps before using a mirror reflected punching bag, the boxer assumed his or her punches were aggressive enough. However, when using a mirror reflective bag, the boxer can perceive their true effort while training. In this scenario the boxer may say to themselves that they can be more aggressive and quicker while executing punches therefore they can step up the intensity while punching with a mirror reflective punching bag. Only with the inventive mirror reflective bag could a boxer and or combat athlete be able to gain such instantaneous feedback and capitalize on it. Feedback such as this can be used to make the necessary adjust in real time which will in turn garner the desired results competitors and users alike are looking for.

According to the present invention, the mirror reflective fabric, mirror reflective material, mirror reflective substance, and/or hardened mirror reflective matter, would be constructed in a way where the material would reflect just as a mirror would. Specialized reflective material could be used to create fabric, hardened material, and or any other substance needed to apply mirror reflection as a way to enable the end user the ability to self-assess movements and technique applied in real time. In the case of fabric, the mirror reflection would have to be pliable and able to bend without distorting the reflection too much, so that the user can effectively assess their motion and form while training.

The following description is in reference to FIG. 1 through FIG. 7. According to a preferred embodiment, the present invention is a large punching bag with a reflective surface. According to the preferred embodiment, the reflective training device comprises a main receptacle 1, an inner cavity 2, a plurality of cushioning layers 3, and a plurality of fasteners 4. Preferably, the main receptable 1 constitutes the big punching bag that may be hung for training purposes. Accordingly, the main receptacle 1 comprises at least one reflective layer 5 and at least one cap layer 6. The reflective layer 5 is intended to reflect like a mirror. The reflective layer 5 can be made of any material deemed necessary to accomplish a mirror effect. Examples of mirror like materials that could be used can and or may include the following, but not limited to, PETG (Polyethylene terephthalate glycol), PET (Polyethylene terephthalate), silver coated material, a sheet that has gallium or other like element, either in liquid or solid form underneath its surface, fabric that can mimic a mirror reflection by way of video imagery, etc.

Figure 3:
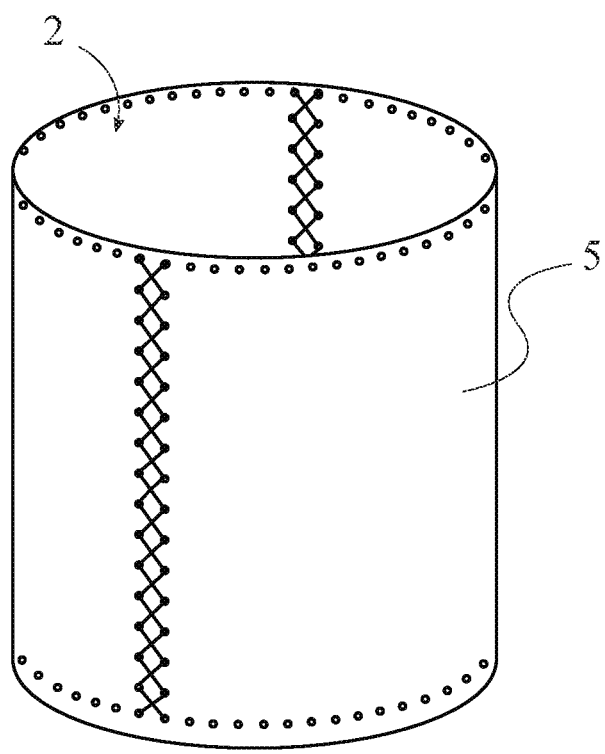
FIG. 3 is a perspective view of a second stage, wherein two reflective layers are attached together along terminal edges of the reflective layers.

In reference to FIG. 2 through FIG. 7 a plurality of stages of construction of a punching bag, according to the present invention is illustrated. In reference to FIG. 2 and FIG. 3, the reflective layer 5 comprises two sheet panels that are connected by means of sewing or stitches. In other words, the reflective layer comprises a first reflective layer 5a and a second reflective layer 5b, wherein terminal edges of the first reflective layer 5a is connected to terminal edges of the second reflective layer 5b. The intention of the sheet panel is for it to reflect like a mirror. In order to keep the shape consistent, the sheet must be rigid enough to maintain a shape, however flexible enough to be able to take form of a desirable and suitable profile that will enable the end user to utilize the benefits of mirrored equipment. Small holes may adorn certain sections of the sheet, like the edges and or other sections. These wholes will allow for stitching techniques to be used to join the sheets and other aspects of the equipment together, ultimately taking the shape of suitable equipment for the end user to train with. The X pattern shown in FIG. 3 represents stitching that will be used to cojoin the reflective layers and or sections of the overall equipment. It should be noted that the reflective layer 5 may comprise any number of panels, shape, size, components, arrangement of components, fastening techniques, etc. that are known to one of ordinary skill in the art, as long as the intents of the present invention are not altered.

Figure 4:
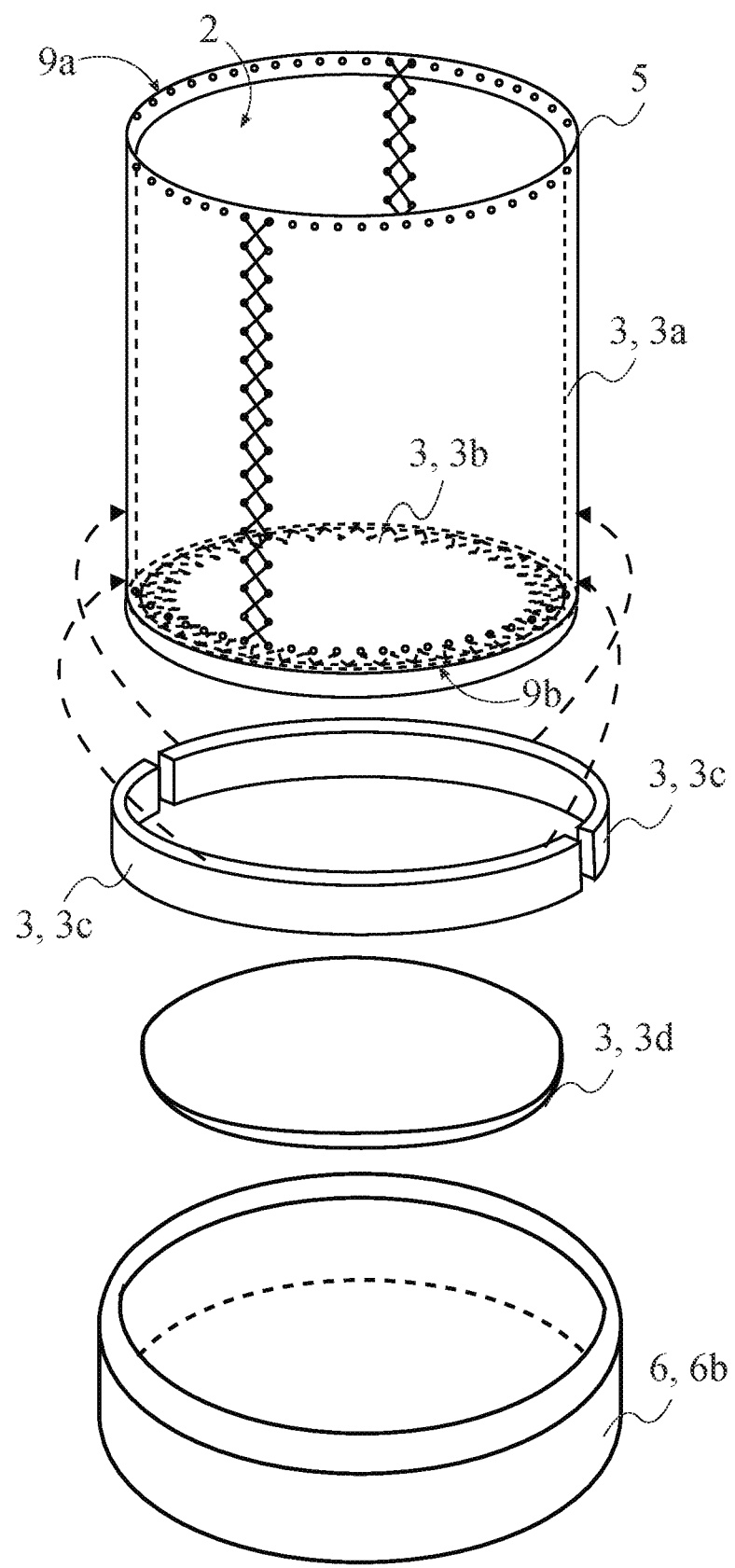
FIG. 4 is an exploded perspective view of the present invention, wherein a bottom end cap, and a plurality of cushioning layers adjacent to the reflective layers are shown.
Figure 5:
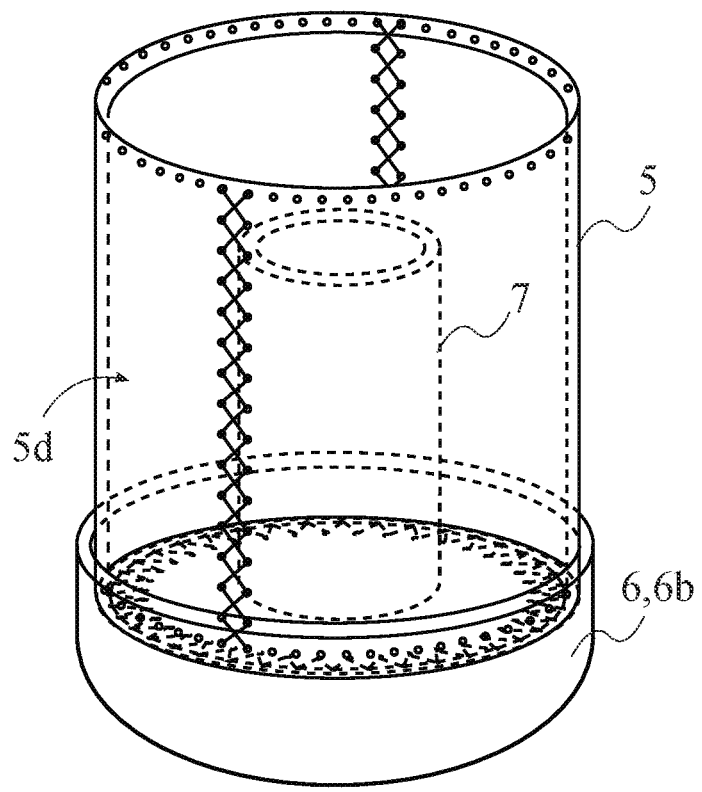
FIG. 5 is a perspective view of a third stage, wherein a bottom end of the device is constructed, and a weighted material housing is mounted within the main body.

As seen in FIG. 3 through FIG. 5, the inner cavity 2 is positioned within the main receptacle 1. The inner cavity 2 constitutes the central vacant space of the punching bag created by the enclosed main receptacle 1, that may be filled with necessary components required for the smooth functioning of the training device. In the preferred embodiment, the reflective layer 5 comprises a first surface 5c and a second surface 5d, wherein the first surface 5c is positioned opposite the second surface 5d across the reflective layer 5. According to the preferred embodiment, the reflective layer 5 delineates the lateral sidewalls of the main receptacle 1, wherein the second surface 5d of the reflective layer is reflective, and the first surface 5c of the reflective layer 5 is oriented towards the inner cavity 2. In other words, the reflective layer 5 constitutes the lateral outer layer of the main receptacle 1, and the user can see a reflective surface around the outer surface of the main receptacle of the punching bag. Preferably, the second surface 5d of the reflective layer 5 comprises polyethylene terephthalate glycol (PETG).

In the preferred embodiment, the cap layer 6 is positioned along terminal ends of the reflective layer 5. In other words, the cap layer 6 constitutes a portion of the outer covering of the main receptacle 1, that acts as a finishing layer and that will give the training device a more refined finish. The cap layer 6 may be made of fabric, and/or any material deemed necessary in order to give the object a more refined look and feel. In the preferred embodiment, the cap layer 6 is hollowed out on one end and capped off on another end, as seen in FIG. 4. Furthermore, the cap layer 6 is stitched to both ends of the training device as seen in FIG. 1 through and FIG. 6.

According to the preferred embodiment, the present invention comprises a weighted material receptacle 7. As seen in FIG. 5, the weighted material receptacle 7 is centrally and detachably mounted within inner cavity 2. Preferably, the weighted material receptacle 7 is a bag that can house weighted materials inside. In the preferred embodiment, the weighted material receptacle 7 is a cylindrical or tubular section housed inside of the main receptacle 1. The weighted material receptacle 7 may comprise any size, shape, material etc. that is deemed necessary in order to achieve the maximum functionality. The function of the weighted material receptacle 7 will allow the user to place sandbags, or other weighted objects inside the punching bag. Accordingly, the present invention comprises a weighted material 8, wherein the weighted material 8 is positioned within the weighted material receptacle 7. Preferably, the weighted material 8 is sand. However, it should be noted that the weighted material 8 may comprise any other material such as water, gel etc. that are known to one of ordinary skill in the art, as long as the intents of the present invention are fulfilled. This will allow the user to add more weight to the bag during training.

It is an objective of the present invention to provide a smooth reflective surface for the reflective training device. To ensure the mirror reflection is not distorted, the material must remain smooth and mostly straightened. Slight curvatures are acceptable but nothing to sharp. To accomplish this as well as to maintain structural integrity of the device, the plurality of cushioning layers 3 is mounted within the inner cavity 2. The plurality of cushioning layers 3 may be affixed to the given sections of the training device by either some form of stitching utilizing the perforated areas for the stitching, using glue or other adhesive material, and/or any other fastening methods that are known to one of ordinary skill in the art, as long as the intents of the present invention are not altered. In the preferred embodiment, the plurality of cushioning layers 3 are positioned around the weighted material receptacle 7. More specifically, the plurality of cushioning layers 3 provides an even shape and sturdy structural form for the training device.

According to the preferred embodiment, a first set of cushioning layers 3a from the plurality of cushioning layers 3 is laterally mounted onto the first surface 5c of the reflective layer 5, wherein the first set of cushioning layers 3a provides a smooth reflective surface for the second surface 5d of the reflective layer. More specifically, the first set of cushioning layers 3a constitute an inner foam layer that will be placed on the back side of the mirrored sheet for providing an even and smooth lining for the reflective layer 5.

Figure 6:
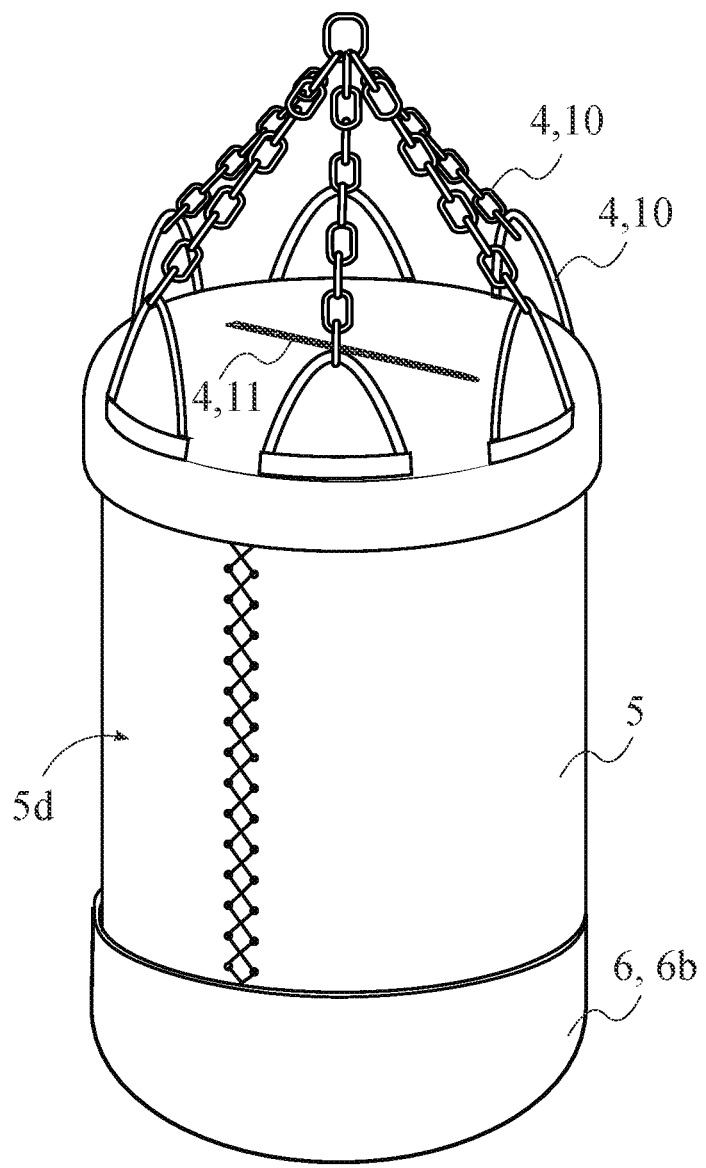
FIG. 6 is a perspective view of the present invention, wherein fasteners are attached along a top end of the training device.
Figure 7:
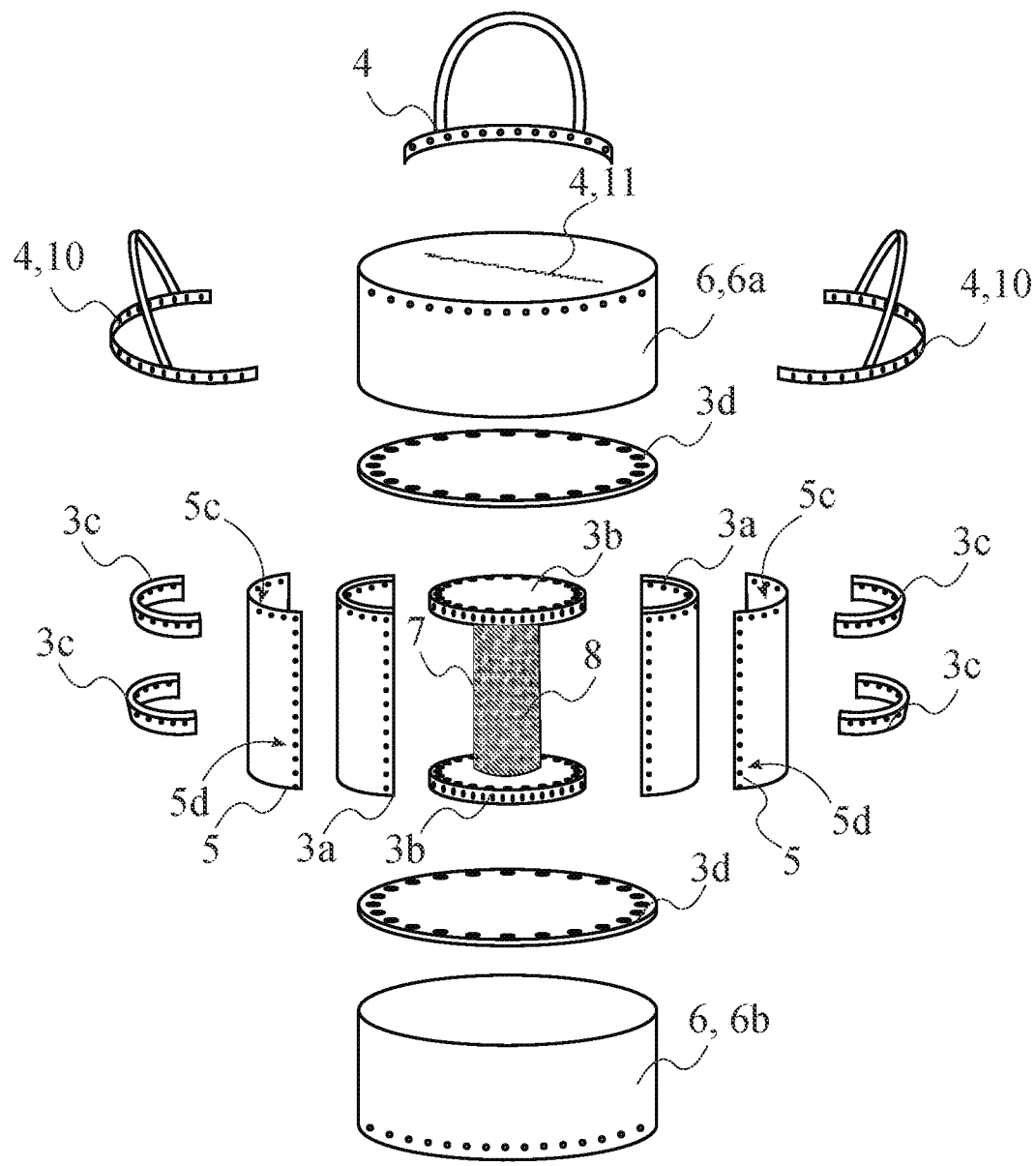
FIG. 7 is an exploded view of the punching bag according to the preferred embodiment of the present invention.
Figure 8:
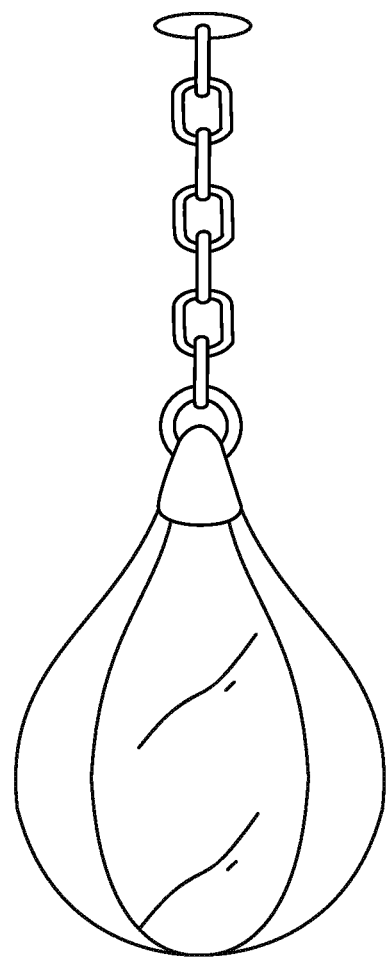
FIG. 8 is a perspective view, wherein the present invention is utilized in an aqua punching bag.
Figure 9:
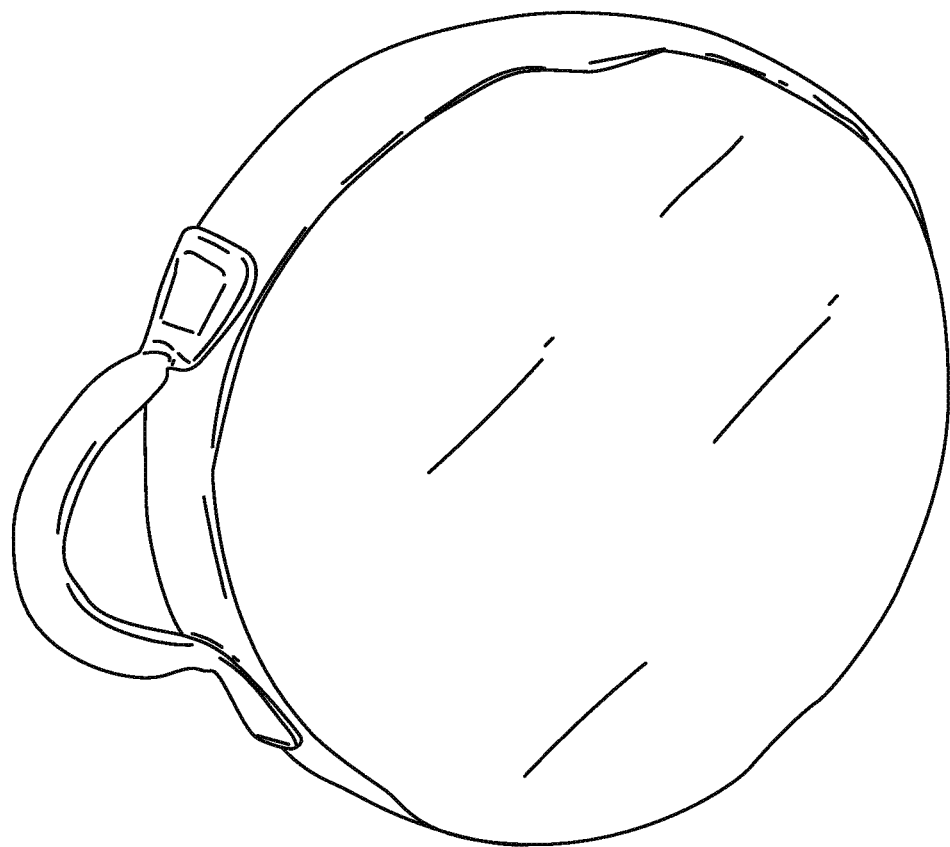
FIG. 9 is a perspective view, wherein the present invention is utilized in an angled boxing punch pad.
Figure 10:
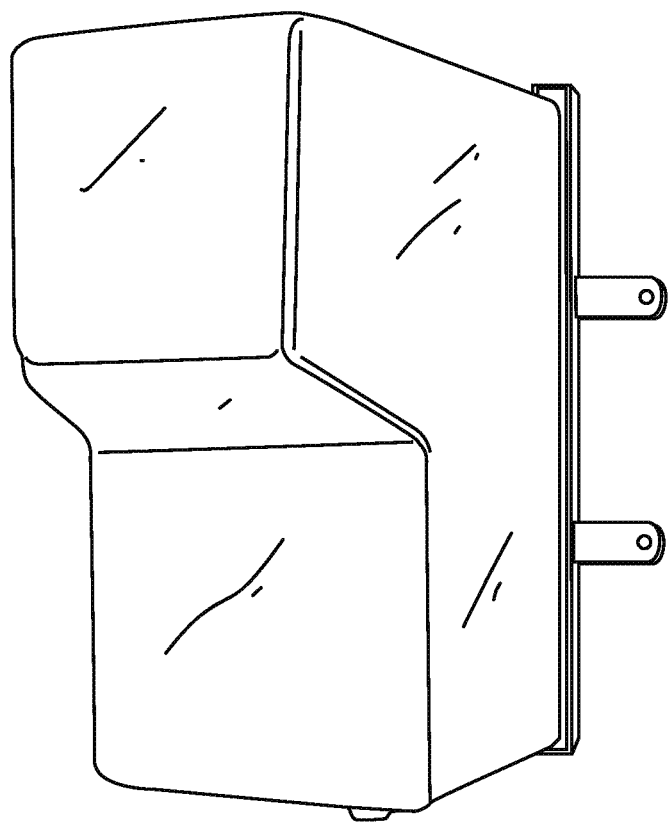
FIG. 10 is a perspective view, wherein the present invention is utilized in a wall mount training bag.
Figure 11:
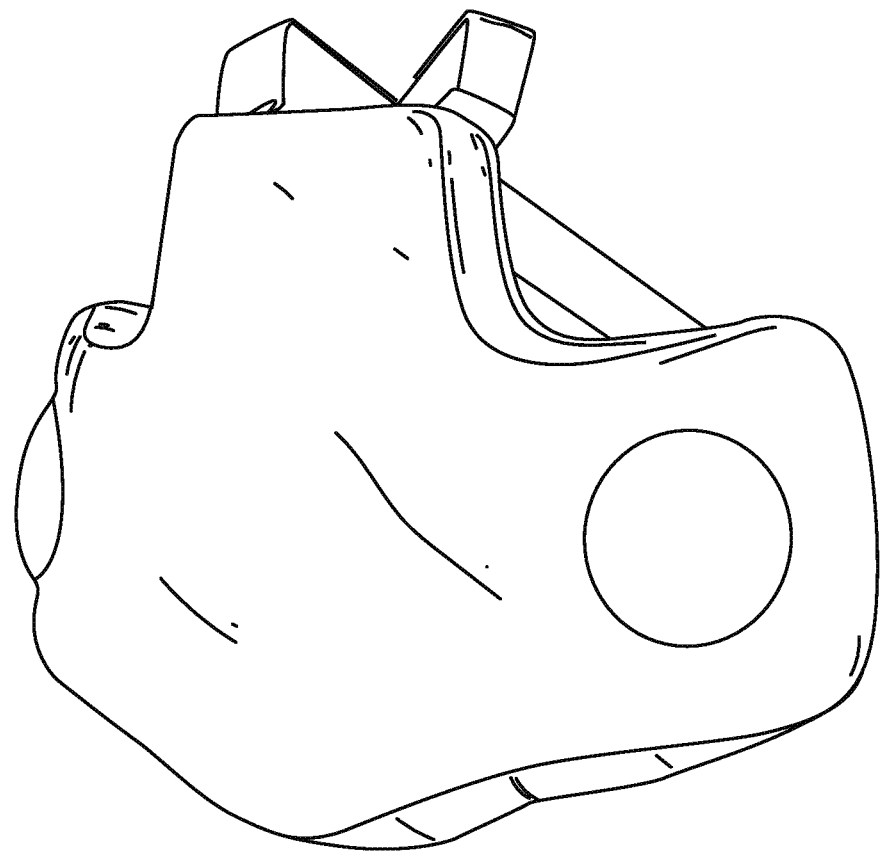
FIG. 11 is a perspective view, wherein the present invention is utilized in a boxing combination body protector.
Figure 12:
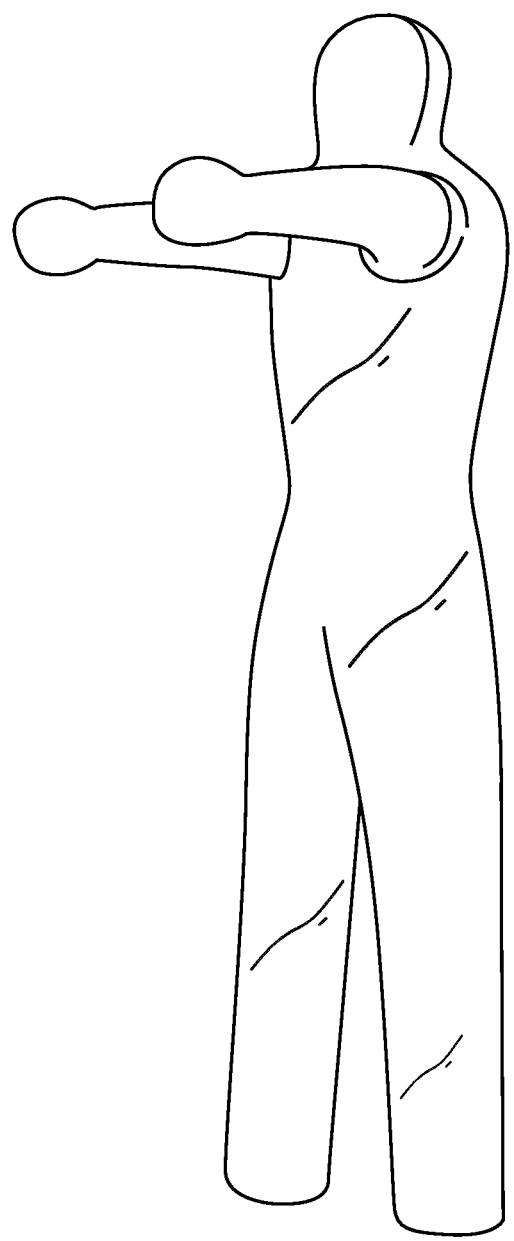
FIG. 12 is a perspective view, wherein the present invention is utilized in a grappling dummy.
Figure 13:
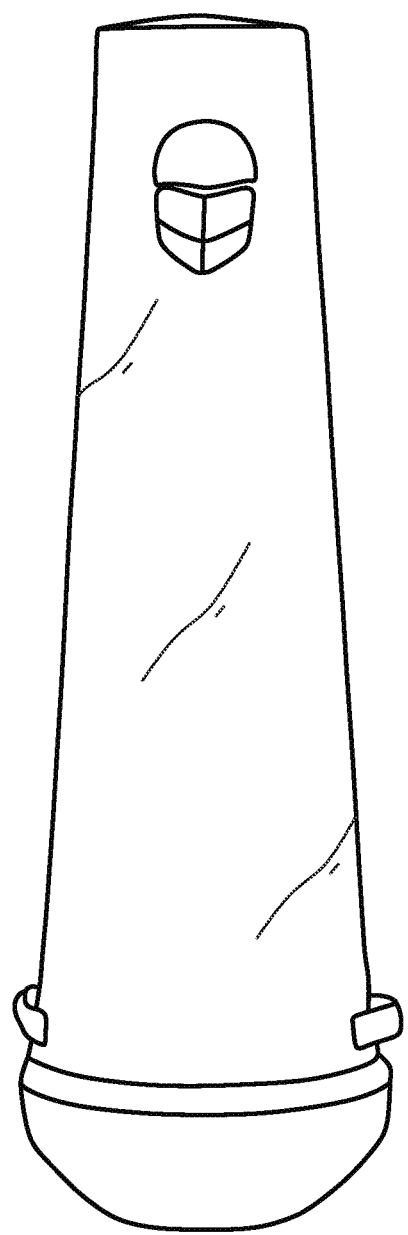
FIG. 13 is a perspective view, wherein the present invention is utilized in a tackling dummy.

Continuing with the preferred embodiment and as seen in FIG. 1, FIG. 6 and FIG. 7, the plurality of fasteners 4 is integrated along the at least one cap layer 6. Preferably, the plurality of fasteners 4 is a set of straps, chains, or clasps, that will enable the user to hang the main receptacle 1 from a ceiling and or other sturdy mechanism. However, the plurality of fasteners 4 may comprise any other fastening mechanism and may be mounted onto any location on the main receptacle, as long as the objectives of the present invention are fulfilled.

A more detailed description of the present invention follows. As seen in FIG. 4, FIG. 5, and FIG. 7, the plurality of cushioning layers 3 comprises different shapes, sizes, locations, orientations, and different functionalities according to the present invention. Accordingly, the plurality of cushioning layers 3 further comprises a second set of cushioning layers 3b, a third set of cushioning layers 3c, and a fourth set of cushioning layers 3d. As seen in FIG. 5 and FIG. 7, the second set of cushioning layers 3b is normally mounted onto terminal edges of the reflective layer 5 within the inner cavity 2. In other words, the second set of cushioning layers 3b are foam layers that are attached to inner edges of the conjoined structure formed by the reflective layer(s) 5. The primary role of the second set of cushioning layers 3b is to keep the shape of the object true to its intended form so that the mirrored affect can be utilized by the end user. As seen in FIG. and FIG. 7, the weighted material receptacle is mounted onto one of the second set of the cushioning layers 3b adjacent to a bottom end of the training device. In the preferred embodiment, the second set of cushioning layers 3b comprises a plurality of holes drilled perimetrically around the edges of the layers. These holes are drilled in a slanted fashion, such that they allow stitching to traverse through these holes as well as the holes on the edges of the reflective layer. Again, the foam will ensure the object maintains a desired shape.

Further, the third set of cushioning layers 3c are laterally mounted around terminal edges of the reflective layer 5. Preferably, the third set of cushioning layers 3c are smaller curved rectangles that goes on the top and bottom outer section of the elongated sides of the reflective layer 5. These small sections provide extra strength and integrity to the edges of the reflective training device. Continuing with the preferred embodiment, the fourth set of cushioning layers 3d is normally mounted around terminal edges of the cap layer 6. Preferably, the fourth set of cushioning layers 3d comprises foam pieces for cushioning purposes to ensure the user does not hurt their hand and or other extremities when striking the object. More specifically, the fourth set of cushioning layers 3d are placed at the ends of the device so it can add cushioning to the rigid edges of the conjoined reflective sheets. Furthermore, the third set of cushioning layers 3c are connected to the fourth set of cushioning layers 3d to maintain seamless connections and structural integrity of the device.

In the preferred embodiment, the second set of cushioning layers 3b and the fourth set of cushioning layers 3d are circular in shape, and the third set of cushioning layers 3c are rectangular in shape. Similarly, the first set of cushioning layers 3a conforms to the shape of the reflective layer 5 and provides lining to the reflective layer. However, the plurality of cushioning layers 3 may take any shape such as rectangular, hexagonal, oval etc., depending on the shape of the training device and may comprise any other material that are known to one of ordinary skill in the art, as long as the intents of the present invention are not altered.

Continuing with the preferred embodiment, the at least one cap layer 6 comprises a first cap layer 6a and a second cap layer 6b. Preferably, the first cap layer 6 is normally connected onto a first terminal end 9a of the reflective layer 5 and the second cap layer 6b is normally connected onto a second terminal end 9b of the reflective layer 5. In other words, and as seen in FIG. 6 and FIG. 7, the first cap layer 6a is attached to a top end of the training device and the second cap layer 6b is attached to a bottom end of the training device as finishing layers.

As seen in FIG. 1, FIG. 6 and FIG. 7, the plurality of fasteners 4 comprises at least one mounting fastener 10 and a main receptacle fastener 11. Preferably, the mounting fastener 10 is attached to the at least one cap layer 6. In the preferred embodiment, the mounting fastener 10 comprises straps and/or chains that gives the device the ability to hang from a ceiling, or other sturdy structures. The mounting fastener 10 may be attached to the training device or main receptacle 1 through stitching, adhesives or any other fastening technique that is known to one of ordinary skill in the art. Further, the main receptacle fastener 11 is operably integrated along the cap layer 6, wherein operating the main receptacle fastener 11 governs access to the inner cavity 2. As seen in FIG. 6 and FIG. 7, the main receptacle fastener 11 is a hook and loop fastener or zipper opening at the top of the object. Alternately, the main receptacle fastener 11 may be integrated along the entire terminal edge of first cap layer 6a as well. This will enable the user to fill the bag with extra weighted material like sandbags, water, etc. However, the main receptacle fastener 11 and the mounting fastener 10 may comprise any other fastening technology, size, shape, location, orientation etc. that are known to one of ordinary skill in the art, as long as the intents of the present invention are not altered.

In reference to FIG. 8 through FIG. 13, some examples of various training devices where the reflective mirror technology may be utilized are illustrated.

Regarding combat sports, mirror reflective technology could be used in various training equipment and or competition gear. A special fabric and or material would be used so that the fighter and or competitor can gain valuable feedback that can assist the user in a beneficial way explained in the scenario above. The technology can be used for various combat training sports as stated above. It can also be used for team sports like basketball, football, etc. The mirror reflective technology can even be used for police security, and armed forces. Often this group practices with padding where officers work on their strikes with a baton. In addition, they also work with a padded assailant for take down purposes, etc. Just like stated before, if the padding was mirror reflected the officer or soldier could gauge their form, technique and perhaps tactics. The ability to assess such notions like these could be greatly beneficial to officers, soldiers, and personnel alike.

Most tackling sports and or grappling sports like football players, wrestlers, and or rugby athletes, etc., involve training with some sort of tackling dummy and or grappling dummy. As in the example with the boxing competitor, users from these sports will use these dummies to train in take downs, tackling and or grappling. The same objective would apply as stated before. These users could use a mirror reflective dummy to gauge one's technique, form, speed, intensity, etc. A host of athletic attributes could be assessed while training with a mirror reflective dummy in real time utilizing game time and or real competition movements. The benefits for such a training method could be insurmountable for athletes looking to gain a competitive edge.

Athletes that use an object during competition such as a ball, bat, racquet, club, etc. could benefit from incorporating a mirror reflective fabric, mirror reflective material, mirror reflective substance, and or hardened mirror reflective matter to such objects to garner the same results as stated above. For example, in the case of a mirror reflective football a football player could see the reflection of his or her hands as he or she catches the ball. This could perhaps allow the football player to adjust their hand positioning while catching the ball. In tennis a mirror reflective material can perhaps be used on the net of the racquet. It could be some sort of perforated mirrored sheet that would allow air to travel through. However, it would allow the tennis player that ability to adjust their strikes of the ball, as to ensure they were striking the ball in the center of the racquet. The utilization for a mirror reflective fabric, mirror reflective material, mirror reflective substance, and or hardened mirror reflective matter could be groundbreaking in the world of sports and competitions. Such usage could allow athletes the ability to gain instant feedback in real-time while performing game time/competition movements with improved efficiency, accuracy, intensity, speed, and other desirable athletic attributes.

The mirror reflective fabric, mirror reflective material and or hardened mirror reflective matter, would be constructed in a way where the material would reflect just as a mirror would. Specialized reflective material could be used to create fabric, hardened material, and or any other substance needed to apply mirror reflection as a way to enable the end user the ability to self-assess movements and technique applied in real time. In the case of fabric, the mirror reflection would have to be pliable and able to bend without distorting the reflection too much, so that the user can effectively assess their motion and form while training.

The mirror reflective fabric, mirror reflective material and or hardened mirror reflective matter, can also be manufactured in sheets. These sheets can be rigid and or pliable. The sheets can have some sort of adhesive backing so that the end user can apply mirror reflection to already existing training equipment that does not originally incorporate mirror reflective technology. The adhesive feature can be made in any necessary fashion so that the specialized mirrored sheets stick and remain to the desired location. The adhesive feature can be achieved with a strong sticking material, Velcro, etc. Also, to adhere the specialized mirrored sheets to the desired object, the sheets can also have the ability to snap on to the desired location. In addition, the sheets may also be constructed in a way where they have a tying and or wrapping mechanism for securing itself to the desired article. Ultimately the mirror reflective technology will be constructed in any necessary way so that the spirit of the innovation can be applied to the objects and or equipment.

Another embodiment of the present invention could be the following:

Option #1 A mirror like film could be wrapped onto the bag and or object, etc. In this option the film could adhere to the object by heat wrapping, adhesive backing, or any other mechanism in order to affix the mirror affect to the desired object.

Option #2 A mirror like film could be wrapped onto the bag and or object, etc. A protective clear vinyl pliable sheet would be laid on top. Heat wrapping, adhesive backing and or any other mechanism would be used to secure the entire assortment of materials together.

Option #3 A mirror like film could be wrapped and or laid onto the clear vinyl, with the protective clear vinyl laid on top. In this option, the two vinyl sheets can then be laid and or wrapped on top the desired object such as a heavy bag, tackling dummy etc. In this option the bottom vinyl layer could adhere to the object by some type of adhesive backing, heat wrapping and or any other mechanism in order to affix the mirror affect to the desired object.

Option #4 In another variation, for any of the options that have the vinyl backing, these configurations can have a buckling and or fastening capability that would allow the mirror affect innovation to fasten around and or to the desired object. This option could have a removable feature to allow the user the ability to remove the mirror affect innovation from object to object. In this option, it also could give the user the ability to switch out an old a damage encasing with a new version of the mirror innovation ensure that the object is able to reflect optimally.

The mirror reflective material can be any color. For example, most mirrors are silver in color. However, the mirror reflection could be gold, blue, red, green, etc. These different colored reflections may be useful as to provide enhanced beneficial experiences, such as better reflection, increased focus, increased clarity, etc.

The mirror reflective material may have other material and or fabric laid underneath to eliminate distortion due to significantly uneven surface spots. The underneath material's purpose would be keeping the mirror reflection material as straight and smooth as possible. The underneath material could be made of burlap, nylon, vinyl, foam, etc. Again, any material deemed necessary to keep the mirror material as smooth as possible with no significant creases.

In addition, to ensure the mirror reflection is not distorted, the material must remain smooth and mostly straightened. Slight curvatures are acceptable but nothing to sharp. With this notion in mind, new shapes may be created in contrast to traditional shapes within certain sports to ensure the reflection is adequate for the user. For example, boxing heavy bags are normally constructed in a cylinder like fashion. To ensure the mirror reflective heavy bag can cast an adequate reflection, the heavy bag may be rectangular, pentagon, hexagon, and or any shape deemed necessary for adequate mirror reflection. This same rule could apply to other sports and or activities. New shapes may be created in these sports to garner the same goals as to provide optimal reflection for the user.

Accordingly, the structure of the present invention can be in the shape of a heavy bag, wall bag, or any other type of object where a compression and or recoil upon impact feature is desired. In an alternate embodiment, the inner cavity may house some spring mechanisms that will allow the reflective panel and or panels to compress and recoil upon impact. This spring mechanism can be a coil spring, ram spring, or any other type of spring mechanism that will render the desired function. These sections will be secured and manufactured in a way where each section will function in its desired purpose. The compression and recoil feature would allow the end user to strike a mirror reflective material that was of a rigid shape and or form. Again, because of the laws of reflection, having a smooth surface ensures a better reflection. Hence in such alternate embodiments, a hardened material would ensure there are no imperfections in the reflective material thus rendering an optimal reflection.

In closing, the mirror reflective fabric, mirror reflective material, mirror reflective substance, and or hardened mirror reflective matter technology can be assembled in any assortment that will render the desired mirror effect. Any variation of the material can be used solely or in conjunction with another. For example, one variation of the mirror reflective technology can utilize mirror fabric exclusively. However, another variation of the technology can use a hardened mirror reflective matter and a mirror reflective fabric in combination on the same object.

The mirror reflective material also may or may not be incorporated on the entire surface of any given object. The reflective material may be partially incorporated on the given object to provide a potentially customizable training experience. For example, there may be one section of the given object that is non-mirror reflective while another section of the same object is mirror reflective. Again, this may be useful in a way to provide the user an alternative aspect to a mirror-reflective training experience.

Although the invention has been explained in relation to its preferred embodiment, it is to be understood that many other possible modifications and variations can be made without departing from the spirit and scope of the invention as hereinafter claimed.

What is claimed is:

1. A reflective training device comprising:
   a main receptacle;
   an inner cavity;
   a plurality of cushioning layers;
   a plurality of fasteners;
   the main receptacle comprising at least one reflective layer and at least one cap layer;
   the at least one reflective layer comprising a first surface and a second surface, wherein the first surface is positioned opposite the second surface across the at least one reflective layer;
   the inner cavity being positioned within the main receptacle;
   the at least one reflective layer delineating lateral sidewalls of the main receptacle, wherein the second surface of the at least one reflective layer is reflective, and the first surface of the at least one reflective layer is oriented towards the inner cavity;
   the at least one cap layer being positioned along terminal ends of the at least one reflective layer;
   the plurality of cushioning layers being mounted within the inner cavity;
   the plurality of fasteners being integrated along the at least one cap layer; and
   a first set of cushioning layers from the plurality of cushioning layers being laterally mounted onto the first surface of the at least one reflective layer, wherein the first set of cushioning layers provides a smooth reflective surface for the second surface of the reflective layer.

2. The reflective training device of claim 1, the plurality of cushioning layers further comprising:
   a second set of cushioning layers;
   a third set of cushioning layers;
   a fourth set of cushioning layers;
   the second set of cushioning layers being normally mounted onto terminal edges of the at least one reflective layer within the inner cavity;
   the third set of cushioning layers being laterally mounted around terminal edges of the at least one reflective layer; and
   the fourth set of cushioning layers being normally mounted around terminal edges of the at least one cap layer.

3. The reflective training device of claim 2, wherein the second set of cushioning layers and the fourth set of cushioning layers are circular in shape.

4. The reflective training device of claim 2, wherein the third set of cushioning layers are rectangular in shape.

5. The reflective training device of claim 2, wherein the third set of cushioning layers are connected to the fourth set of cushioning layers.

6. The reflective training device of claim 1, comprising:
   at least one weighted material receptacle;
   a weighted material;
   the weighted material receptacle being centrally and detachably mounted within inner cavity;
   the weighted material being positioned within the weighted material receptacle.

7. The reflective training device of claim 6, wherein the plurality of cushioning layers is mounted around the weighted material receptacle.

8. The reflective training device of claim 6, wherein the weighted material receptacle is cylindrical in shape.

9. The reflective training device of claim 1, wherein the first set of cushioning layers conforms to the shape of the at least one reflective layer and provides lining to the at least one reflective layer.

10. The reflective training device of claim 1, the at least one cap layer comprising:
    a first cap layer and a second cap layer,
    the first cap layer being normally connected onto a first terminal end of the at least one reflective layer; and
    the second cap layer being normally connected onto a second terminal end of the at least one reflective layer.

11. The reflective training device of claim 1, the plurality of fasteners comprising:
    at least one mounting fastener and a main receptacle fastener;
    the at least one mounting fastener being attached to the at least one cap layer;
    the main receptacle fastener being operably integrated along the at least one cap layer, wherein operating the main receptacle fastener governs access to the inner cavity.

12. The reflective training device of claim 1, the at least one reflective layer comprising:
    a first reflective layer and a second reflective layer;
    the first reflective layer being terminally connected to the second reflective layer.

13. The reflective training device of claim 1, wherein the second surface of the at least one reflective layer is polyethylene terephthalate glycol (PETG).

14. A reflective training device comprising:
    a main receptacle;
    an inner cavity;
    a plurality of cushioning layers;

at least one weighted material receptacle;
a plurality of fasteners;
the main receptacle comprising at least one reflective layer and at least one cap layer;
the at least one reflective layer comprising a first surface and a second surface, wherein the first surface is positioned opposite the second surface across the at least one reflective layer;
the inner cavity being positioned within the main receptacle;
the reflective layer delineating lateral sidewalls of the main receptacle, wherein the second surface of the at least one reflective layer is reflective, and the first surface of the at least one reflective layer is oriented towards the inner cavity;
the at least one cap layer being positioned along terminal ends of the at least one reflective layer;
the weighted material receptacle being centrally and detachably mounted within the inner cavity;
the plurality of cushioning layers being mounted within the inner cavity;
the plurality of fasteners being integrated along the at least one cap layer;
a first set of cushioning layers from the plurality of cushioning layers being laterally mounted onto the first surface of the at least one reflective layer, wherein the first set of cushioning layers provides a smooth reflective surface for the second surface of the at least one reflective layer.

* * * * *